United States Patent [19]

Hubbard

[11] Patent Number: 5,199,386
[45] Date of Patent: Apr. 6, 1993

[54] VARIABLE AIR AND WATER INJECTION APPARATUS FOR INTERNAL COMBUSTION ENGINES

[76] Inventor: Von J. Hubbard, 3536 Churchwood Dr., Salt Lake City, Utah 84118

[21] Appl. No.: 871,058

[22] Filed: Apr. 20, 1992

[51] Int. Cl.$^5$ .............................. F02B 47/00
[52] U.S. Cl. ..................... 123/25 E; 123/25 A; 123/1 A
[58] Field of Search ............ 123/1 A, 25 A, 25 R, 123/25 E

[56] References Cited

U.S. PATENT DOCUMENTS

| 4,119,062 | 10/1978 | Trevaskis | 123/25 R |
| 4,125,092 | 11/1978 | Inamura | 123/25 B |
| 4,141,323 | 2/1979 | Hart | 123/25 B |
| 4,191,134 | 3/1980 | Goodman | 123/25 R |
| 4,279,223 | 7/1981 | Csonka | 123/25 R |
| 4,391,229 | 7/1983 | Turner | 123/25 B |
| 4,391,230 | 7/1983 | Pesce | 123/25 E |
| 4,397,268 | 8/1983 | Brown | 123/25 R |
| 4,589,376 | 5/1986 | Albertson | 123/25 E |
| 4,800,848 | 1/1989 | Hubbard | 123/25 E |

Primary Examiner—E. Rollins Cross
Assistant Examiner—Erick Solis
Attorney, Agent, or Firm—Marcus G. Theodore

[57] ABSTRACT

A fluid injection system for injecting atomized fluids into the intake manifold of an internal combustion engine comprising: a fluid reservoir to hold a supply of fluid, means to transport the fluid to a T junction mixer having i) a pre-mixing chamber, ii) a flow adjustable fluid intake port to receive the fluid and deliver it to the pre-mixing chamber, and iii) a simultaneously restricted air and water flow intakes to deliver a predetermined approximately constant ratio air to water flows into the pre-mixing chamber for atomization of the fluids, and collector means to collect and transport the atomized fluid mixture into the intake manifold.

6 Claims, 1 Drawing Sheet

VARIABLE AIR AND WATER INJECTION APPARATUS FOR INTERNAL COMBUSTION ENGINES

BACKGROUND OF THE INVENTION

1. Field

This invention relates to water injection apparatus for internal combustion engines. More particularly, it relates to a fluid injection system for injection of variable air and water mixtures into the manifold of an internal combustion engine in response to the intake pressures created therein.

2. State of the Art

Various fluid injection systems to inject water into an internal combustion engine to improve combustion are known. These water injection systems have become more popular in response to environmental concerns to reduce air emissions of unburned by-products. Peace et al., U.S. Pat. No. 4,391,230, illustrates a water injection apparatus for internal combustion engines mounted on the air fuel manifold of the engine. The Peace device utilizes a conduit system to provide a continuous flow of fluid mixture into the manifold, a second conduit connecting to the main conduit to inject a continuous flow into the carburetor, and a third conduit connecting the crankcase to the first conduit to collect and recirculate unburned fuel mixtures for re-injection into the carburetor. This device requires adjustment of the pressures in the manifold, carburetor, and crankcase for efficient fluid injection, and is primarily directed to reduction of air emissions. Turner, U.S. Pat. No. 4,391,229, discloses a steam injection apparatus heating a flow of fluid to produce steam via a coil associated with the exhaust system of a vehicle before injecting the same into the carburetor. This device requires extensive adjustments when ambient temperatures fluctuate, and the engine is not warm. In the field tests conducted by applicant, the Turner system left large beads of fluids in the lines when the engine is shut off. These fluids freeze, or are drawn into the engine in spurts upon re-start of the engine which causes erratic rough operations until the engine vacuum has cleared the air pockets in the lines. The Turner system vacuum is structured to directly pull water, but does not include a water regulator. Hence the fluid injection fluctuates as the water pick up varies when the level of the fluid in the holding tank goes down. After the vacuum to the engine has been shut off, the air valve regulating the fluid feed rate into the heating coils also has to be continually adjusted. The Turner device proportionates adjusts both the air and water inflows for admixture from both intake ports as the engine vacuum increases. It thus fails to provide an increasingly fluid enriched air mixture for injection into the intake manifold as the vacuum created by the engine operation increases.

The Turner air inlet is not restricted to allow a fixed flow of air through its valve to increase the liquid/air ratio of injected mist. Instead, the Turner device allows both the air and fluid flows to proportionally increase to provide a constant air/fluid mixture for injection into the engine until the line flow capacity of either the air or fluid lines is exceeded. Then, either the air or fluid flows will disproportionately increase in response to the increasing engine vacuum causing either a richer or leaner mixture to be injected. Without continuous adjustment of the both valves, wide fluctuations of the air/fluid mixture may result. For example, after initial setting, the air/fluid mixture is constant until line flow capacities of either the air or fluid lines is exceeded. At the point where either the line capacity of the fluid or the air lines is exceeded, different air fluid mixtures result. This irregular fluctuation of the Turner air/fluid mixtures creates highly inefficient combustion. Turner thus fails to provide an increasingly rich air/fluid mixture for injection into the intake manifold as the vacuum created by the engine operation increases. Consequently, the Turner device requires varying combustions of both the air and water valve intake adjustments over the operating range of the engine to insure optimal combustion performance. This continuous valve adjustment procedure is difficult when operating an internal combustion engine under operating conditions. Most vehicles do not allow continuous adjustment while operating.

Hart, U.S. Pat. No. 4,141,323, discloses another device utilizing a heater to inject a heated water vapor mixture into the carburetor for more efficient burning. Hart also suffers from the Turner starting problems as extreme ambient temperatures are encountered. Hart, U.S. Pat. No. 4,208,989 discloses another variation to produce heated air which is passed through a water filled container to produce vaporized water for injection into the carburetor. This moisture laden air has a tendency to precipitate in the lines when cold temperatures are encountered. Inamura, U.S. Pat. No. 4,125,092 discloses another device to inject a heated air water mixture at a point below the throttle and no later than the point the air fuel mixture enters the intake manifold. It requires a sophisticated timing system in response to the engine RPM's, which injects an air/water mixture when the engine is accelerating. Csonka et al., U.S. Pat. No. 4,279,223, discloses an internal combustion engine fuel saving and pollution reduction system. The device utilizes a recirculating system to collect condensed water from the exhaust gas of an engine, and re-circulates the same for injection into the carburetor. Means are required to control the amount of water passing into the engine. Temperature fluctuations of the ambient air materially affect the condensate characteristics of the exhaust gas, making cold starts difficult to regulate and control. Goodman, U.S. Pat. No. 4,191,134 discloses a fluid injection system and method for an internal combustion engine to inject a finely divided spray of fluid into the engine in response to both the engine speed and the exhaust gas pressure. This device requires careful regulation of the engine intake and exhaust pressures via an air injection pump system.

Hubbard, U.S. Pat. No. 4,800,848 discloses a water injection apparatus for Internal Combustion Engine which injects water mixtures into the manifold of an internal combustion engine in response to the intake pressures created therein. The device cannot simultaneously adjust both the water to air ratios to enable an engine to used with different fuel mixtures.

None of these devices provides a simple device to provide fluid injection of various air/water mixtures directly into the intake manifold of an internal combustion engine in response to the vacuum created therein.

SUMMARY OF THE INVENTION

Applicant's invention comprises a fluid injection system for injecting aqueous fluids into the intake manifold or carburetor of an internal combustion engine. The system comprises an aqueous fluid reservoir containing a supply of liquid. Fluid conduit means convey the liquid to a T junction mixer to deliver a predetermined flow of fluid. The T junction has a combination adjustable air/water intake valve to simultaneously adjust the air and water flows into the T junction pre-mixing chamber. The pre-mixing chamber mixes a predetermined essentially constant ratio of air and water flows over the operating range of the engine into the pre-mixing chamber where its is essentially vaporized into a fine mist. The atomized fluid is then selectively released through an adjustable vacuum valve to transfer the same via conduit means for injection into the engine intake manifold in response to the vacuum created therein.

In one preferred embodiment, the mixer is a block of nylon or plexi-glass with a longitudinal tubular passage through which tubing may be inserted. At right angles to the longitudinal tubular passage is a water delivery tubular passage forming a T junction with the longitudinal tubular passage. The water delivery tube passage has a conduit leading to a water source to convey the same to the T junction. This delivery tube usually has a water filter associated with the end of the delivery tube to screen out scale and sediments from entering into the engine system.

A rigid piece of PVC tubing approximately the same diameter as the tubular passage is inserted into the longitudinal tubular passage extending just beyond the T junction to overlap the same approximately a quarter of an inch. The other end of the PVC tubing is connected to an air filter associated with an ambient air source to draw in air into the PVC tubing. An adjustable air/water set screw is screwed in at right angles to the PVC tubing to simultaneously press the PVC tube over the water delivery tubular passage to restrict the intake of water, while compressing the PVC tube to control the air flow through said PVC tube.

The PVC air delivery tube leads into a pre-mixing chamber defined by the longitudinal tubular passage wherein the air and water is atomized. This pre-mixing chamber is in communication with a delivery tube inserted within the remaining tubular opening of the T junction to transport the atomized mist into the intake manifold. This delivery tube may also be selectively restricted by a vacuum set screw placed at right angles to the delivery tube to reduce the vacuum draw to limit an essentially constant air to water ratio flow into the pre-mixing chamber. The vacuum set screw is adjusted to provide varying air flows to provide the necessary combustion requirements for differing types of fuels. The air and water flows are restricted to insure the air flow does not exceed the maximum air flow required to continuously draw liquid into the T junction. The air and water flows are thus set at a flow rate to prevent the breaking of the siphoning action drawing liquid into the T junction to insure a continuous flow of liquid entering the pre-mixing chamber over the operating range of the engine for mixing with air. Once set for a selected fuel, the air/water set screw is not again adjusted.

The vacuum set screw is then set to restrict the vacuum pull on the T junction mixer to insure that the idle air into the carburetor is properly adjusted.

The Bernouli air flows through the air intake tube past the T junction causes the air and liquid mixtures drawn into the pre-mixing chamber to come into contact and admix. The air/water set screw tube restriction creates air turbulence to insure efficient mixing of the air and liquid to provide an atomized stream exiting the T junction via the delivery tube.

To operate the device, the engine is started creating a vacuum suction within the manifold, the delivery tubes, and the T junction. In response to the vacuum in the T junction, fixed ratio flows of ambient air and water are drawn into the pre-mixing chamber of the T junction via the air and fluid intake means for atomizing. The pre-mixed air/water atomized fluid mixture is then delivered into the manifold by the delivery tube in response to the vacuum created therein to be mixed with intake air from the air filter.

The point of delivery into the manifold is the intake port where the positive crankcase ventilation (PCV) connects. The delivery tube is joined to the PCV line via a T connector to deliver the atomized mixture into the PCV line. This method and point of delivery is used for ease in hooking up the system, although any other point could be used, provided it injects the atomized fluid mixture in a manner which admixes with the air/fuel mixture delivered from the carburetor into the intake manifold. Partial pre-mixing of the atomized mist with the unburned fuel and gases occurs within the PCV line. This pre-mixing aids in providing a more uniform combustion mixture for injection into the engine.

The device is adjusted by running the engine at a fast idle, creating a vacuum pressure within the intake manifold of approximately 15 lbs./sq. inch. The restricted air intake provides approximately 50 SCFH entering the air intake into the T junction. The air/water set screw is then adjusted to mix approximately 13 parts of air with 1 part liquid for injection into the intake manifold. This produces a flow rate of fluid into the valve of approximately 0.1 LPM. The T junction vacuum set screw is then adjusted so that the desired amount of fixed air and fluid mixture ratios are injected into the intake manifold in direct response to the vacuum of the intake manifold. Even though the intake manifold pressure increases, a constant air/fluid mixture is injected. To offset the increased vacuum in the intake manifold as the engine reaches higher rpm's, additional air is drawn in from the carburetor and admixed with the atomized fluid mixture to provide a leaner air/fluid mixture for injection into the engine.

Preferably, the water and delivery tube conduit means are constructed of $\frac{1}{4}$th inch inside diameter soft plastic plastic tubing, The air delivery tubing is constructed of Polyvinyl Chloride or a similar rigid material, which will not collapse when a vacuum is created therein. The air intake port may include a filter to prevent grit in the air drawn into the T junction from entering the engine.

The device may be connected to the windshield washer bottle of a conventional vehicle to use the alcohol washer fluid contained therein, rather than requiring a separate fluid reservoir. If the washer bottle fluid is used, the alcohol washer fluid mixture increases the octane combustion characteristics of the fuel mixture entering the carburetor. An alcohol fluid mixture also prevents the fluid mixture from freezing when the device is used in cold climates.

A cut off valve may be included between the mixing valve and the delivery tube to shut off the system should it be necessary to shut off the water injection system. For example, a recreational vehicle may be outfitted with the device adjusted to inject high levels of water when the recreational vehicle engine encounters high loads. The cut off valve is thus activated to prevent water injection when normal load conditions are encountered. In one preferred embodiment, a solenoid operated cut off valve is used having a valve junction which also acts to again mix the air/fluid mixture as it flows through before injection into the intake manifold. Secondary mixing is accomplished by passing the mixture through a restricted juncture which creates turbulence, thereby re-mixing the atomized mixture.

A heat activated valve may be included to activate the system when the engine reaches a predetermined temperature. This heat activated valve is particularly used in colder climates, where fluids tend to build up in engines over night. Before applicant's device should be employed, it is necessary for the engine to first heat up and drive off this fluid build-up for optimal performance. In one preferred embodiment, the water conduit from the reservoir fluid means connects to a thermostat valve placed in between the mixing valve and the intake manifold. The thermostat valve is attached to the exhaust manifold. As the exhaust manifold temperature rises, the engine fluids are driven off. The thermostat valve then opens allowing atomized water to pass into the intake manifold.

The atomized air/liquid mixture provides an oxygen enriched water mixture for injection into the intake manifold; providing better engine combustion characteristics, particularly for vehicles used at high altitudes. Thus, the variable air and water injection apparatus provides improved engine performance similar to that experienced with the Hubbard water injection apparatus, U.S. Pat. No. 4,800,848—i.e. significantly improved power and cleaner burning when the invention is utilized with an internal combustion engine. Testing results show that fuel consumption is minimized by approximately 10%, while acceleration is also increased. Not only is fuel use minimized, but air emissions are also reduced. In one test on a 1979 Chevrolet Caprice which did not have a catalytic converter system, hydrocarbon carbon emissions were reduced from 1,780 ppm to 97 ppm. CO emissions were reduced from 3.74% to 0.3%.

Mileage was also improved from 14 mpg to 18.9 mpg. The atomized water mixture also cools the internal combustion chambers within the engine to minimize pre-ignition knocking. When an enriched alcohol water mixture is used, the atomized alcohol mixture added to the fuel provides a higher octane fuel mixture, providing more power. Thus, the invention provides the same advantages of other fluid injection systems, but avoids their complicated valve maintenance and adjustment problems to regulate the air inputs, temperatures, and fluid injection rates.

The device can be readily installed on conventional vehicles, without sophisticated tools, or training. The system also does not take up significant room within the engine compartment, particularly when used in association with the windshield washer bottle of the vehicle.

DESCRIPTION OF THE ILLUSTRATED EMBODIMENTS

Figure 1:
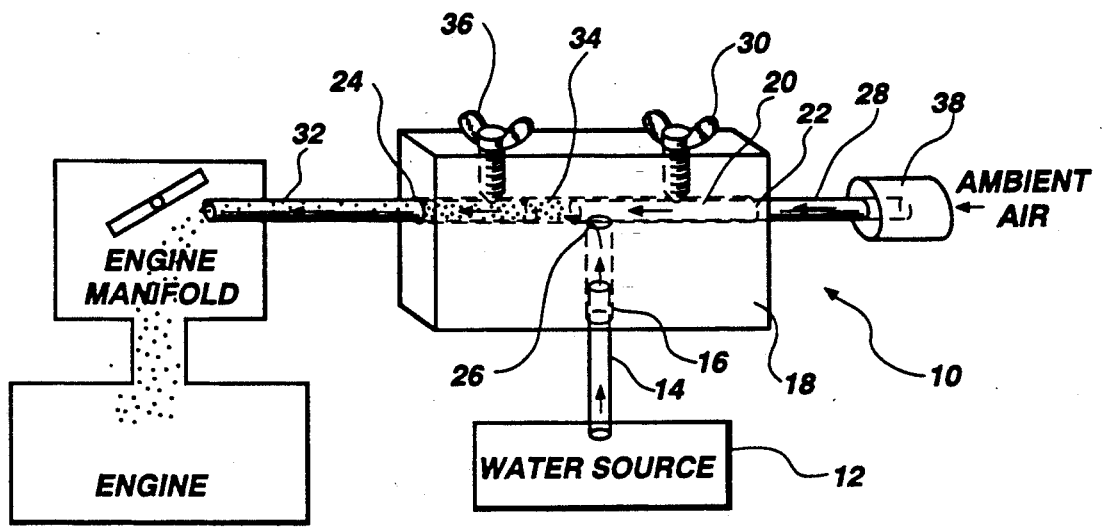
FIG. 1 is a perspective view of one embodiment of the invention.
Figure 2:
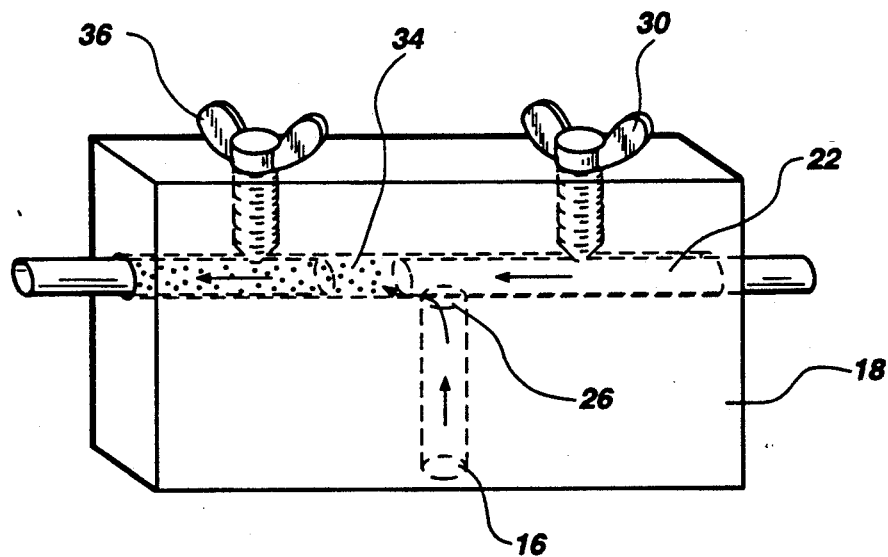
FIG. 2 is a perspective view of the T junction mixer.

FIG. 1 illustrates one embodiment of applicant's invention 10. The water injection system comprises a water source 12 i.e. a water bottle capable of holding approximately one gallon of a water solution. Said bottle 12 mounts to the wall (not shown) of the engine compartment of a conventional vehicle. A one fourth inch outer diameter PVC tube 14 is connected to the bottle 12 to transport fluid therefrom to the fluid inlet 16 forming the base of a T junction mixer 18 made of a water corrosive resistant housing. The T junction mixer 18 has a longitudinal tubular passage 20 with an air inlet 22 and a mixture outlet 24 leading past a right angle junction 26 with the fluid inlet 16 to inject at right angles a predetermined stream of fluid into the air stream as shown in FIG. 1. The junction 26 right angle of injection of the fluid stream creates air turbulence as an air stream is directed past the junction 26 to mix with the fluid. The T junction mixer 18 does not have a needle adjusting screw to selectively restrict the fluid flow entering the junction 26. These types of valves tend to foul with water scaling deposits. Instead, an air inlet tube 28 in communication with an ambient air source is inserted through the air inlet 22 and extends past the junction 26 approximately one quarter of an inch. The junction 26 is therefore partially restricted atomizing fluid into the air stream directed past the junction 26. The air flow entering the T junction mixer 18 is restricted via an air set screw 30 screwed in at right angles against the air inlet tube 28 and adjusted to insure that the air flow past the junction 26 creates sufficient negative air pressure draw to not break the siphon action drawing fluid into the junction 26 to produce an atomized mixture as shown in FIG. 2. The T junction mixer 18 is adjusted to draw in approximately 0.1 LPM fluid to be mixed with approximately 13 parts of air to 1 part liquid. The T junction mixer 18 does not have to be machined to close tolerances so that fluid/air adjustments can be made very accurately. Instead, a soft tube 32 in communication with the engine manifold is inserted into the mixture outlet 24 in proximity with the end of the air inlet tube 28 to form a pre-mixing chamber 34 within the longitudinal tubular passage 20. A vacuum set screw 36 screwed in at right angles against the soft tube 32 is then and adjusted to reduce the vacuum draw of the engine manifold The air/fuel mixture is drawn into the intake manifold by the vacuum suction created by the engine through the soft tube 32 conduit means generally connected with a T coupling to the PVC line to inject the mixture into the intake manifold.

The size of the pre-mixing chamber can be varied by sliding the soft tube 32 and the air inlet tube 28 forward and backward as needed to provide complete atomization of the fluid.

An air regulator and filter 38 is associated with the air inlet tube 28 comprising a connecting piece of one eighth inch inner diameter PVC hollow tubing to filter the ambient air entering the air inlet 22. The air set screw 30 is then adjusted to limit the amount of air entering the T junction mixer 18 to approximately 50 SCFH, which insures that the siphoning action drawing fluids into the same is not broken.

The fluid mixture in the water bottle 12 is preferably comprised of a mixture of ethanol, or similar alcohol additive, and water. The ethanol additive is added mainly in the winter months and comprises approximately 25% alcohol and 75% water. The percentage of alcohol additive added declines as the engine octane requirements decline, or the ambient operating temperatures rise.

To prevent back siphoning of fluid into the intake water bottle after the engine 30 has been turned off, a check valve (shown in FIG. 4 of U.S. Pat. No. 4,800,848) may be included. If included, the check valve is mounted in association with the opening 16 of the PVC tube 14 entering the water bottle 12 to hold a fluid column in the tube 14 to immediately deliver a fluid stream to the T junction mixer 18 when the engine is started. The check valve insures that an atomized fluid mixture is injected immediately without having to wait for a vacuum build up within the tube 14 to draw fluids from the water bottle 12.

A solenoid shut-off valve (shown in FIG. 5 of U.S. Pat. No. 4,800,848 may be included to shut the system off, when desired. If included, the shut-off valve is associated with the mixture conduit 32 between the T junction mixer 18, and the intake manifold. Thus the system 10 may be isolated by a user operating the shut-off valve when making repairs or adjustments to the system. The system 10 can also be selectively operated and turned on only when additional power is required by injecting atomized water into the engine at these times. This particular type of shut off valve can act as a secondary mixing chamber, as well as a shut-off, to again atomize the air/water mixture to provide a fine mist for injection into the intake manifold.

The system 10 is adjusted by setting the vacuum set screw 36 to add on the average one part of water/alcohol to 15 to 17 parts of fuel in response to the vacuum created by the engine 30. Preferably distilled or demineralized water is used to prevent scaling buildup within the engine 30. A fluid filter (not shown) may also be included to filter the fluid before it enters the fluid conduit 14.

A heat activated switch (not shown) may be included after the T junction mixer 18 to inject atomized fluids into the intake manifold when the engine reaches a predetermined temperature. As the switch is heated by the intake manifold it opens a thermostat at a pre-determined temperature (preferably approximately 190° F.). The atomized fluid then passes through the heat activated switch and is conveyed to the intake manifold to cool the engine for more optimal performance.

Although this specification has made reference to the illustrated embodiments, it is not intended to restrict the scope of the appended claims. The claims themselves recite those features deemed essential to the invention.

I claim:

1. A fluid injection system for injecting a mist of fluids essentially comprised of water, and water soluble alcohol mixtures, into the intake manifold of an internal combustion engine for mixing with the hydrocarbon fuels powering the engine for more complete combustion comprising:
   a. a fluid reservoir to hold a supply of fluid,
   b a T junction mixer component having:
      i. a water corrosive resistant housing defining a longitudinal tubular passage with an air inlet and a mixture outlet, and a right angle tubular passage forming a T junction with the longitudinal tubular passage, said right angle tubular passage having a water inlet leading into a pre-mixing chamber within the longitudinal tubular passage
      ii. a rigid tube with a first end inserted within the air inlet of the longitudinal tubular passage extending to a point beyond the T junction to partially obstruct the water inlet and divert the fluid into the pre-mixing chamber, said rigid tube having a second end associated with an ambient air source to deliver a predetermined approximately constant air flow into the pre-mixing chamber,
      iii. an adjustable set screw screwed in at right angles to the rigid tube to selectively restrict the air flow therethrough and deliver air to the pre-mixing chamber, while simultaneously restricting the water inlet to reduce the fluid flow into the pre-mixing chamber there through, where it turbulently mixes incoming fluid and air streams,
      iv. a fluid intake tube inserted within the right angle tubular passage water inlet in communication with the fluid source to deliver a pre-set water flow to prevent the breaking of the siphoning action drawing fluid into the pre-mixing chamber for atomization into an atomized constant air to fluid mixture, and,
   c. mixture conduit means associated with the mixture outlet to collect and transport the pre-mixing chamber's atomized fluid mixture for delivery into the intake manifold for admixture with the air drawn into the air intake of the engine in response to the vacuum created therein for blending with the fuel.

2. A fluid injection system according to claim 1, wherein the fluid reservoir is structured as a window washer bottle.

3. A fluid injection system according to claim 1, wherein the fluid comprises a mixture of water and alcohol.

4. A fluid injection system according to claim 3, including an air regulator filter associated with the second end of the rigid tube to filter and restrict the amount of ambient air entering the pre-mixing chamber.

5. A fluid injection system according to claim 1, wherein the mixture conduit means comprises a soft tubing inserted within the mixture outlet of the longitudinal tubular passage and extending proximate to the pre-mixing chamber, and including an adjustable vacuum set screw screwed in at right angles to selectively restrict the soft tubing to adjust the amount of vacuum pull from the intake manifold drawing in the atomized mixture.

6. A fluid injection system according to claim 1, wherein the soft tubing and rigid tube are slideably adjusted to vary the distance therebetween defining the pre-mixing chamber to provide the optimum size of the pre-mixing chamber to atomize the air and fluid.

* * * * *